United States Patent Office  3,542,856
Patented Nov. 24, 1970

3,542,856
CERTAIN PEROXYESTERS HAVING A DEFINED SUBSTITUENT POSITIONED ON A CARBON ATOM AT LEAST BETA TO A PEROXYCARBON ATOM
Orville Leonard Mageli, Kenmore, and Wilbur H. McKellin, Buffalo, N.Y., assignors to Pennwalt Corporation, East Orange, N.J., a corporation of Pennsylvania
No Drawing. Filed Aug. 1, 1966, Ser. No. 569,030
Int. Cl. C07c 69/12, 69/18, 69/22
U.S. Cl. 260—488                                    5 Claims

ABSTRACT OF THE DISCLOSURE

Beta-substituted peroxyesters useful as polymerization initiators.

---

This invention relates to substituted peroxyesters where a substituent is positioned on a carbon atom that is separated from a peroxy carbon atom by at least one other carbon atom, i.e., is at least beta to a peroxy carbon atom.

Herein the term "peroxy carbon atom" refers to carbon atom in the group $$-\overset{O}{\underset{\|}{C}}-OO-$$

this group is also known as the carbonyl dioxy radical.

The term "beta to a peroxy carbon atom" is illustrated by a beta substituted peroxy caproic acid:

$$CH_3-CH_2-CH_2-\overset{sub}{\underset{|}{C}H}-CH_2-\overset{O}{\underset{\|}{C}}-OOH$$

which peroxyacid is also named: 3-sub-peroxyhexanoic acid.

The uses of peroxyesters as initiators for the polymerization of ethylenic monomers is well known and has found extensive commercial application. The currently available peroxyesters, while effective, have been found to be limited in their utility because the relationship between the rate of polymerization and the temperature at which the polymerizations are carried out has a determining effect on the properties of the polymers produced. It has been necessary to compromise the properties of the polymer with the rate of polymerization.

Attempts to influence the peroxyesters' reactivity by substitution of various groups on the carbon alpha to the carboxylic acid group is known to cause a marked decrease in the thermal stability of the peroxyesters derived from these acids.

We have now found that by the proper substitution on carbon atoms at least beta to the peroxy carboxylic acid group, it is possible to control the thermal stability of peroxyesters. It is particularly surprising that groups which are known to cause a decrease in thermal stability when substituted on the alpha carbon of the acid, show a marked increase in the thermal stability of the peroxyesters when positioned on at least the beta carbon atom.

As a means of illustrating the changes in the thermal stability of peroxyesters obtained by the proper substitution on the acid chain, the time required for half of the peroxyester to decompose at a given temperature and in a given solvent is determined as reported in Modern Plastics #6, 142 (1959), D. F. Doehnert and O. L. Mageli. By this substitution we have now found it possible to obtain peroxyesters with increased thermal stabilities as indicated by half-life. These permit a more precise control of the rates of polymerization since peroxyesters suitable for a particular desired polymerization rate can be provided.

In addition to controlling the thermal stability of the new peroxyesters, we have also found that it is possible to obtain the desired effects with more than one type of chemical grouping so that, as desired, it is possible to include substituent groups which are advantageous to the properties of the polymer.

One aspect of the invention is an ester of a substituted peroxyalkanoic acid having at least 3 carbon atoms in the peroxyalkanoic portion and having at least one substituent "sub." A "sub" is positioned on a carbon atom which carbon atom is separated from a peroxy carbon atom of the acid by at least 1 other carbon atom. The "sub" substituent is selected from the class consisting of F; Cl; $R_2SO_2-$; OH; $R_3SO-$; $R_4OOC-$; $R_4O-$; $R_5COO-$; $(R_6)_2PO-$ $$O=\overset{O-}{\underset{O-}{\overset{|}{S}}} ; \quad O=\overset{O-}{\underset{O-}{\overset{|}{P}}} ; \quad R_6\overset{O-}{\underset{O-}{\overset{|}{P}}} ; \quad O=\overset{O-}{\underset{O-}{\overset{|}{C}}} ; \quad \text{and} \quad \overset{R_7}{\underset{R_8}{>}}C\overset{O-}{\underset{O-}{<}}$$

where $R_2$ and $R_3$ are aliphatic, cycloaliphatic, or aromatic; $R_4$ is aliphatic or cycloaliphatic; $R_5$ and $R_6$ are aliphatic, cycloaliphatic, aromatic, alkoxy or mercapto; $R_7$ is hydrogen, aliphatic, cycloaliphatic or aromatic; $R_8$ is hydrogen, aliphatic, cycloaliphatic, or alkoxy; $R_1$ in the perester group $$R_1OO\overset{O}{\underset{\|}{C}}-$$

present in the acid is aliphatic or cycloaliphatic.

A second aspect of the invention is an ester of a substituted cycloaliphatic peroxycarboxylic acid having 3–8 carbon atoms in the ring, and having at least one substituent "sub" or $-(R_{12}-sub)$. One substituent is positioned on a ring carbon atom such that "sub" is separated from a peroxy carbon atom of the acid by at least one other carbon atom. "Sub" is selected from the class consisting of F; Cl; $R_2SO_2-$; $R_3SO-$; $R_4OOC-$; OH; $R_4O-$; $R_5COO-$; $(R_6)_2PO-$ $$O=S\overset{O-}{\underset{O-}{<}} ; \quad O=P\overset{O-}{\underset{O-}{<}} ; \quad R_6P\overset{O-}{\underset{O-}{<}} ; \quad O=C\overset{O-}{\underset{O-}{<}} ; \quad \text{and} \quad \overset{R_7}{\underset{R_8}{>}}C\overset{O-}{\underset{O-}{<}}$$

where $R_2$ and $R_3$ are aliphatic, cycloaliphatic, or aromatic; $R_4$ is aliphatic or cycloaliphatic; $R_5$ and $R_6$ are aliphatic, cycloaliphatic, aromatic, alkoxy or mercapto; $R_7$ is hydrogen, aliphatic, cycloaliphatic, or aromatic; $R_8$ is hydrogen, aliphatic, cycloaliphatic, or alkoxy; $R_{12}$ is methylene or alkylene diradical having 2–6 carbon atoms; $R_1$ in the perester group $$R_1OO\overset{O}{\underset{\|}{C}}-$$

present in the acid is aliphatic or cycloaliphatic.

A third aspect of the invention is an ester of a substituted peroxy carboxylic acid having a heterocyclic portion:

$$Y\underset{\underset{(CH_2)_n}{\diagdown}}{\overset{\overset{(CH_2)_n}{\diagup}}{\diagdown}}C\overset{R_{14}}{\underset{}{-}}\overset{O}{\underset{\|}{C}}-OOR_1$$

where $n$ is an integer equal to 1–3; $R_1$ is aliphatic or cycloaliphatic; $R_{14}$ is hydrogen or aliphatic.

Y is selected from the class consisting of $$O=C\overset{O-}{\underset{O-}{<}} ; \quad O=P\overset{O-}{\underset{O-}{<}} ; \quad O=S\overset{O-}{\underset{O-}{<}} ; \quad R_6P\overset{O-}{\underset{O-}{<}} ; \quad (R_6)_2P-O-$$

$$\overset{R_7}{\underset{R_8}{>}}C\overset{O-\phantom{O}O}{\underset{O-\phantom{O}O}{<}} ; \quad \overset{}{\underset{}{>}}P\overset{O-\phantom{O}}{\underset{O-\phantom{O}}{<}} ; \quad \begin{array}{c}\\ \diagup\hspace{-2pt}\diagdown \\ \diagdown\hspace{-2pt}\diagup \\ C=\!\!\!\!=\!\!\!\!O \end{array} ; \quad \text{and} \quad \begin{array}{c} O=C- \\ | \\ (CH_2)_m \\ | \\ O=C- \end{array}$$

where $m$ is 0–3; $R_6$ is aliphatic, cycloaliphatic, aromatic, alkoxy or mercapto; $R_7$ is hydrogen, aliphatic, cycloaliphatic, or aromatic; and $R_8$ is hydrogen, aliphatic, cycloaliphatic or alkoxy.

ESTER OF SUBSTITUTED PEROXY ALKANOIC ACID

It has been discovered that the position of the hereinbefore defined substituent "sub" relative to the peroxy carbon atom has a surprising influence on the thermal stability, defined by half-life, of esters of substituted peroxyalkanoic acids, substituted peroxycycloaliphatic carboxylic acids and the hereinbefore defined "heterocyclic" peroxy acid. When the substituent "sub" is positioned on a carbon atom which is at least beta to a hereinbefore defined peroxy carbon atom, the half-life is increased over that of the corresponding non-substituted peroxyester. In other words, "sub" is positioned on a carbon atom which is separated from a peroxy carbon atom by at least one other carbon atom, i.e., the separation between "sub" and the respective peroxy carbon atom in the case of a beta orientation is two carbon atoms—a gamma orientation represents a separation of three carbon atoms. It appears that any "sub" to peroxy carbon atom separation of two or more carbon atoms gives a peroxyester having a longer half-life. Usually, the peroxyester used has a "sub" to peroxy carbon atom separation of about 2 to 5, i.e. beta to zeta oriented. It appears that the "separation" is the important influence on the longer half-life of the peroxyesters of this invention and this feature is controlling regardless of the nature of "sub" or the "R" portion of the peroxyester; however it is to be understood that the half-life of the peroxyester is indeed affected by the type of "sub" present therein.

The peroxyesters of this aspect of the invention are illustrated by beta substituted peroxypropionic acid:

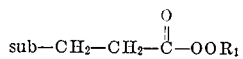

and by beta substituted peroxypivalic acid:

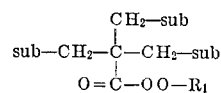

and also:

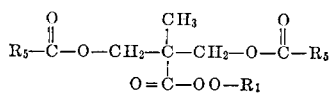

Especially of interest are those peroxyesters: where the peroxyalkanoic portion has 3–10 carbon atoms; or $R_1$ is alkyl having 1–8 carbon atoms; or "sub" is chloro or acyloxy having 1–8 carbon atoms or alkoxy carbonyl.

ESTERS OF SUBSTITUTED CYCLOALIPHATIC PEROXYCARBOXYLIC ACID

These peroxyesters have been defined earlier as the second aspect of this invention. A particular aspect of these is directed to those peroxyesters connected with a ring derivable from cyclohexane. "Sub" may be positioned directly on a ring carbon atom or through another group, defined as $R_{12}$. More than one peroxy group

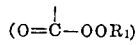

and more than one "sub" or "$R_{12}$ sub" may be present.
The following formulas are illustrative:

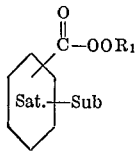 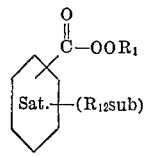 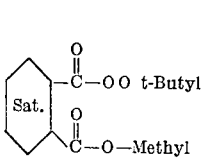

ESTERS OF SUBSTITUTED PEROXYCARBOXYLIC ACID HAVING A HETEROCYCLIC PORTION

These peroxyesters have been defined earlier as the third aspect of this invention. An illustrative peroxyester is:

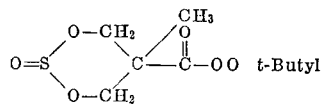

PREPARATIONS

The hereinbefore defined peroxyesters are made readily by the Schotten-Bauman type of procedure in which the acid chloride or anhydride is treated with hydroperoxide in the presence of aqueous alkali, tertiary amine or pyridine: Organic Peroxide—Davies 1961 (Butterworths), pp. 58–59; Berichte, 17, 2544 (1884); Berichte, 19, 3218; Organic Preparations—Weygand (New York, 1945), p. 180; J. Agri. Chem. Soc. (Japan), 27, 674 (1953), C.A., 49, 7527a.

Typical alkyl, hydroxyalkyl, aralkyl and alkynyl hydroperoxides which are operable in the aforementioned reaction include: t-butyl hydroperoxide, t-amyl hydroperoxide, 1,1,3,3-tetramethylbutyl hydroperoxide, cumene hydroperoxide, p-menthane hydroperoxide, diisopropylbenzene hydroperoxide, 2-methyl-2-hydroperoxy-4-hydroxypentane, 2,5-dimethylhexane-2,5-dihydroperoxide, and 2,5-dimethylhexyne-3,2,5-dihydroperoxide.

ILLUSTRATIVE COMPOUNDS

Example 1.—t-Butyl 3-carbomethoxyperoxypropionate

A solution of 30.1 g. (0.2 mole) of 3-carbomethoxypropionyl chloride dissolved in 25 ml. of ether was added to a mixture of 20 g. (0.22 mole) of 99.5% t-butyl hydroperoxide and 88 g. (0.22 mole) of 10% sodium hydroxide solution, stirred at 10–15° C. An additional 25 g. of 10% sodium hydroxide solution was added to bring the pH of the aqueous phase to 9–10. After stirring for one hour at 25° C., the ether layer was separated and washed, dried over anhydrous magnesium sulfate and the ether removed under reduced pressure. The product assayed 83% by active oxygen assay.

Example 2.—t-Butyl 3-chloroperoxypropionate

A reaction mixture containing 23.1 g. (0.2 mole) of t-butyl hydroperoxide (78% pure containing 22% di-t-butyl peroxide), 8.0 g. (0.1 mole) of pyridine as an acid acceptor and 75 ml. of benzene was stirred at 5–10° C. while 12.7 g. (0.1 mole) of 3-chloropropionyl chloride was slowly added over 30 minutes. The reaction mixture was allowed to warm to 25° C. and then stir for 20 hours. The precipitated pyridine hydrochloride was removed by filtration and the organic layer washed free of pyridine with tartaric acid solution. After washing with 10% sodium hydroxide solution, the benzene solution of the product was washed with water and the organic layer dried over anhydrous sodium sulfate.

An 86% yield of t-butyl 3-chloroperoxypropionate of 97% purity by active oxygen determination remained after the volatiles had been removed under reduced pressure.

Example 3.—t-Butyl 2,2-bis(acyloxy methyl) peroxypropionate (A) t-Butyl 2,2-bis(acetoxymethyl)peroxypropionate: A solution of 35.0 g. (0.148 mole) of 2,2-bis(acetoxymethyl)propionyl chloride dissolved in 50 ml. of ether was added to a stirred mixture of 18.0 g. (0.2 mole) of 99% t-butyl hydroperoxide and 12.0 g. (0.152 mole) of pyridine at 20° C. After stirring for 20 hours, the precipitated pyridine hydrochloride was removed by filtration. The ethereal filtrate was washed with tartaric acid solution, sodium bisulfite solution, sodium carbonate solution and water, and dried over anhydrous magnesium sulfate. Removal of the ether under reduced pressure gave 26 g. of product assaying 96.5% pure by active oxygen assay.

(B) t-Butyl 2,2-bis(isobutyryloxymethyl)peroxypropionate was prepared in 95.6% purity.

(C) t-Butyl 2,2-bis(pivaloxymethyl)peroxypropionate in 99% purity by active oxygen assay.

Example 4.—t-Butyl 3-chloroperoxybutyrate

A solution of 21.2 g. (0.15 mole) of 3-chlorobutyryl chloride dissolved in 25 ml. of ether was added to a stirred mixture of 13.8 g. (0.175 mole) of pyridine and 15.3 g. (0.17 mole) of 99% t-butyl hydroperoxide at 20° C. The reaction mixture was allowed to stir at 30° C. for 20 hours. The precipitated pyridine hydrochloride was removed by filtration and the ethereal filtrate washed with tartaric acid solution, sodium bisulfite solution, sodium bicarbonate solution and water and then dried over anhydrous magnesium sulfate. Removal of the ether under reduced pressure gave 25.8 g. of product having the calculated active oxygen assay and a purity of 96.5% as determined by the chlorine assay.

Example 5.—t-Butyl 4-chloroperoxybutyrate

A solution of 28.2 g. (0.2 mole) of 4-chlorobutyryl chloride in 25 ml. of pentane was added over 20 minutes to a stirred solution of 22 g. (0.22 mole) of 90% t-butyl hydroperoxide and 68.5 g. (0.25 mole) of 20% potassium hydroxide solution at 0° to 5° C. The reaction mixture was stirred for 15 minutes at 0° C., the pentane layer separated, washed with sodium bisulfite solution, sodium bicarbonate solution and water and then dried over anhydrous magnesium sulfate. Removal of the pentane under reduced pressure gave 35.5 g. of product assaying 96% pure by active oxygen assay, 95% pure by chlorine assay.

Example 6.—t-Butyl β-chloroperoxyisobutyrate

A solution of 28 g. (0.2 mole) of β-chloroisobutyryl chloride dissolved in 15 ml. of ether was added over 20 minutes to a stirred mixture of 22 g. (0.22 mole) of 90% t-butyl hydroperoxide and 68.5 g. (0.25 mole) of 20% potassium hydroxide solution at 0 to 3° C. After stirring for 15 minutes, an additional 25 ml. of ether was added, the ethereal layer washed with sodium bisulfite solution, sodium bicarbonate solution and water and then dried over anhydrous magnesium sulfate. Removal of the ether under reduced pressure gave 36.5 g. of the product in 92% purity as determined by the active oxygen assay.

Example 7.—t-Butyl peroxymonochloropivalate

The monochloropivaloyl chloride (3-chloro-2,2-dimethylpropionyl chloride) was made in the dark from equimolar amounts of sulfuryl chloride and pivalic acid in the presence of a small amount of benzoyl peroxide after which the reaction mixture was treated with an excess of thionyl chloride.

The final reaction mixture was purified by means of a vacuum distillation. The main fraction of the distillate came over at a top temperature of 85°–86° C. at an absolute pressure of 60 mm. Hg. This value was the same as the one reported in JACS, 62, 925–29 (1940).

The distilled chloropivaloyl chloride was used to prepare t-butyl peroxymonochloropivalate in the presence of pentane according to a Schotten-Bauman reaction. t-Butyl hydroperoxide was used in a 10% molar excess over the chloropivaloyl chloride and the reaction was carried out at −5° C. Excess t-butyl hydroperoxide was removed from the reaction mixture by means of the buffered sulfite reduction method. Most of the pentane was removed by vacuum evaporation. The final product was analyzed according to two independent methods:

(a) The active oxygen content was determined by means of Lucidol Method #13 and the Sulfit Method.

| | Percent |
|---|---|
| Act. [0] by M–13 | 7.09 |
| Act. [0] by $SO_3^=$ | [1] 0.06 |
| Net act. [0] | [2] 7.03 |

[1] Percent t-BuOOH=0.35%.
[2] Theor. act. [0] : 7.67%.

(b) The total chlorine content was determined by means of sodium biphenyl. The assay calculated from this method was 92.4%.

These two results are in very good agreement with each other. The obtained compound is t-butyl peroxymonochloropivalate.

It was found that t-butyl peroxymonochloropivalate crystallized during storage in the refrigerator which is not the case when t-butyl peroxypivalate is stored under the same conditions. The obtained product was not shock sensitive on the Du Pont tester at heights of 2, 4 and 6 inches and decomposed rapidly at 86° C. in the Rapid Heat Test.

The curing properties of t-butyl peroxymonochloropivalate in a standard polyester resin system were compared to those of t-butyl peroxypivalate. Both materials were tested at a 1% concentration.

The results are presented in the table below:

TABLE 1.—82° C. (180° F.) SPI EXOTHERM

| | t-Bu peroxy pivalate | t-Bu peroxy chloropivalate |
|---|---|---|
| Gel time (mins.) | 0.9 | 2.7 |
| Cure time (mins.) | 1.9 | 4.0 |
| Peak exotherm (° F.) | 425 | 415 |

The substitution of a Cl atom in the pivalate has a stabilizing effect in this perester. This is confirmed by the result of the half-life determination of t-butyl peroxychloropivalate in a 0.2 N solution in benzene as compared to that of t-butyl peroxypivalate. At 70° C. the half-life of t-butyl peroxychloropivalate is 3.41 hrs.; the half-life of t-butyl peroxypivalate under the same conditions is 1.56 hrs.

Example 8.—t-Butyl 2-carbomethoxyperoxyhexahydrobenzoate

A solution of 20.4 g. (0.1 mole) of 2-carboxymethylhexahydrobenzoyl chloride in 25 ml. of pentane was added to a mixture of 11.3 g. (0.125 mole) of t-butyl hydroperoxide and 7.9 g. (0.1 mole) of pyridine stirred at 10–15° C. The reaction mixture was stirred at 25° C. for 2 hours, the pyridine hydrochloride removed by filtration and the solvent layer washed with tartaric acid solution, sodium bisulfite solution, and water. The solvent layer was dried over anhydrous magnesium sulfate and the solvent removed under reduced pressure. A yield of 22.1 g. of product having an active oxygen assay of 4.46% was obtained.

Example 9

(A) 1 - methyl-4-oxo-3,5-dioxa-4-thiacyclohexane carboxylic acid (this is not a peroxy acid): A reaction mixture of 134 g. (1.0 mole) of 2,2-bis(hydroxymethyl)-propionic acid and 405 g. (3.4 mole) of thionyl chloride was heated while stirring to 50–53° C. for 3 hours. After cooling, the mixture was filtered and the solid product washed with pentane. A sample of the air dried under product M.P. 150–155° C. was recrystallized from benzene for analysis. Calculated for $C_5H_8O_5S$: S, 17.7; neutral equivalent, 180.11. Found: S, 17.1; neutral equivalent, 179.6.

(B) 1 - methyl - 4-oxo-3,5-dioxa-4-thiacyclohexane carbonyl chloride: A reaction mixture of 67 g. (0.5 mole) of 2,2-bis(hydroxymethyl)propionic acid and 225 g. (1.9 mole) of thionyl chloride was heated at reflux temperature, 70° C.–75° C., for 4 hours. After removal of the excess thionyl chloride under reduced pressure the product was distilled under reduced pressure. B.P. at 0.1 torr was 66° C., $n_D^{25}$ 1.4830. Calculated for $C_5H_7ClO_4S$: Cl, 17.8; S, 16.2. Found: Cl, 17.1; S, 16.3.

It is believed that the higher temperature and longer time of (B) permitted the acid intermediate of (A) to convert to the (B) product.

(C) t-Butyl 1 - methyl-4-oxo-3,5-dioxa-4-thiacyclohexaneperoxycarboxylate: A solution of 19.8 g. (0.1 mole) of 1-methyl-4-oxo-3,5-dioxa-4-thiacyclohexane carbonyl chloride dissolved in 25 ml. of ether was added to a stirred mixture of 10.8 g. (0.12 mole) of 99% t-butyl hydroperoxide, 9.9 g. (0.125 mole) of pyridine and 50 ml. of ether at 20° C. over one hour. After stirring at 25–30° C. for 18 hours, the pyridine hydrochloride was separated by filtration, the ethereal filtrate washed with tartaric acid solution, sodium bisulfite solution, sodium bicarbonate solution and water and then dried over anhydrous magnesium sulfate. Removal of the ether under reduced pressure gave 24.2 g. of product M.P. 58–60° C. Calculated for $C_5H_7O_6S$: S, 12.7. Found: S, 12.6. Calculated purity 99.8%.

Example 10.—t-Butyl-3 hydroxyperpropionate 4 g. of NaOH (50%) was added to a cooled (0±1° C.) solution of 600 g. (6 moles) of t-butyl hydroperoxide (90%). To this mixture was added β-propio lactone (74 g., 1 mole) over a period of 30 minutes.

The mixture was allowed to stir for one hour at 1±1° C.

The NaOH was neutralized with the calculated amount of concentrated HCl and the solid that separated filtered off.

The excess t-butyl hydroperoxide was distilled under reduced pressure.

A yield of 140 g. of colorless liquid was obtained. Theor. yield, 164 g. Act. (0) gave 8.57%. Theor. active oxygen, 9.85% or 87.3% pure.

HALF-LIVES OF VARIOUS PEROXYESTERS

The half-life of certain substituted t-butyl peroxyesters of this invention and of comparative non-substituted t-butyl peroxyesters was determined. These are set in the following Table 2. A 0.2 molar solution in odorless mineral spirits (OMS) or in benzene (Bz) was used for the determination.

TABLE 2

Compound t-BuOOC—A

| Where A is: | Solvent | Temperature, °C. | Half-life, hours |
|---|---|---|---|
| —$CH_2$—$CH_3$ | Bz | 100 | 10.5 |
| —$CH_2$—$CH_3$ | OMS | 100 | 10.55 |
| —$CH_2$—$CH_2$—Cl | OMS | 100 | 21.2 |
| —$CH_2$—$CH_2$—$SO_2$—Ph | Bz | 100 | |
| —$CH_2$—$CH_2$—$CH_2$—Cl | OMS | 100 | 19.3 |
| —$CH_2$—CH($Cl$)—$CH_3$ | OMS | 100 | |
| —$CH_2$—CH($Cl$)—$CH_3$ | Bz | 100 | |
| —CH($CH_3$)—$CH_3$ | Bz | 85 | 3.6 |
| —CH($CH_3$)—$CH_3$ | Bz | 70 | 28.8 |
| —CH($CH_2Cl$)—$CH_3$ | Bz | 85 | 6.0 |
| —C($CH_3$)($CH_3$)—$CH_3$ | Bz | 85 | 0.25 |
| —C($CH_3$)($CH_3$)—$CH_3$ | Bz | 70 | 1.56 |
| —C($CH_3$)($CH_2Cl$)—$CH_3$ | Bz | 70 | 3.41 |

TABLE 2—(Continued)

Compound t-BuOOC—A

| | Solvent | Temperature, °C. | Half-life, hours |
|---|---|---|---|
| —C($CH_2Cl$)($CH_2Cl$)—$CH_3$ | Bz | 85 | 2.0 |
| —C($CH_2Cl$)($CH_2Cl$)—$CH_2Cl$ | Bz | 85 | |
| —C($CH_3$)($CH_2$-O-CO-$CH_3$)—$CH_2$-O-CO-$CH_3$ | Bz | 85 | 5.4 |
| —C($CH_3$)($CH_2$-O-CO-CH($CH_3$)$_2$)—$CH_2$-O-CO-CH($CH_3$)$_2$ | Bz | 85 | 4.4 |
| —C($CH_3$)($CH_2$-O-CO-C($CH_3$)$_3$)—$CH_2$-O-CO-C($CH_3$)$_3$ | Bz | 85 | 4.5 |
| 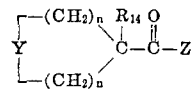 | Bz | 85 | 5.4 |

SUBSTITUTED CARBOXYLIC ACID, OR ESTER, OR CARBONYL HALIDE HAVING A HETEROCYCLIC PORTION

The carboxylic acids, their ester, and the corresponding carbonyl halides having the following formula are novel compounds, useful as intermediates for the preparation of the hereinbefore defined peroxyester of the third aspect of this invention—see aforesaid Example 9.

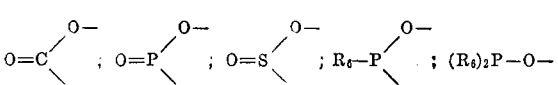

where $n$ is an integer equal to 1–3; $R_{14}$ is hydrogen or aliphatic; Y is selected from the class consisting of

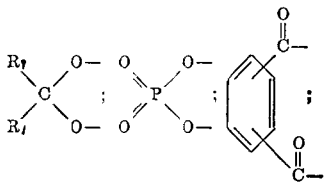

and

where $m$ is 0–3; $R_6$ is aliphatic, cycloaliphatic, aromatic, alkoxy or mercapto; $R_7$ is hydrogen, aliphatic, cycloaliphatic, or aromatic; $R_8$ is hydrogen, aliphatic, cycloaliphatic and alkoxy; or Z is OH, Cl, Br and —OR$_1$ and R$_1$ is aliphatic or cycloaliphatic.

Illustrative acid and carbonyl chloride are:

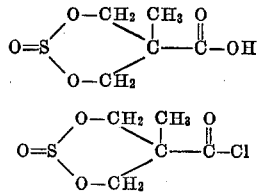

Thus having described the invention what is claimed is:
1. A peroxyester of a substituted alkanoic acid,
   (1) said acid having 3-10 carbon atoms in said alkanoic portion;
   (2) said acid having 1-3 substituents R$_5$COO— positioned on different carbon atoms which carbon atoms are separated from a peroxy carbon atom of said acid by at least 1 other carbon atom;
   (3) wherein R$_5$ is alkyl having 1-7 carbon atoms; and
   (4) R$_1$ in said peroxyester group

is tertiary alkyl having up to 8 carbon atoms.

2. A peroxyester of pivalic acid:

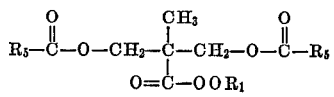

wherein
R$_1$ is tertiary alkyl having up to 8 carbon atoms; and
R$_5$ is alkyl having 1-7 carbon atoms.

3. The peroxyester of claim 2 where R$_1$ is t-butyl and R$_5$ is methyl.

4. The peroxyester of claim 2 where R$_1$ is t-butyl and R$_5$ is isopropyl.

5. The peroxyester of claim 2 where R$_1$ and R$_5$ are t-butyl.

References Cited

Davies et al.: Chemical Abstracts, vol. 48 (1954), p. 7537d.

Balenovic et al.: Chemical Abstracts, vol. 56 (1962), p. 4663f.

JAMES A. PATTEN, Primary Examiner

U.S. Cl. X.R.

260—80, 327, 338, 410.6, 410.9, 453, 463, 468, 478, 485, 487, 936